United States Patent

Tsuk

[15] 3,637,521
[45] Jan. 25, 1972

[54] DEMULSIFICATION OF SULFONATED OIL EMULSIONS

[72] Inventor: Andrew G. Tsuk, Laurel, Md.

[73] Assignee: W. R. Grace & Co., New York, N.Y.

[22] Filed: June 26, 1969

[21] Appl. No.: 836,979

[52] U.S. Cl............................252/326, 252/327, 252/344
[51] Int. Cl..........................................................B01d 17/00
[58] Field of Search..................252/321, 326, 344, 345, 336, 252/327, 330, 331

[56] References Cited

UNITED STATES PATENTS

| | | | |
|---|---|---|---|
| 3,235,501 | 2/1966 | Waldmann | 252/321 |
| 3,313,736 | 3/1967 | Dickson et al. | 252/321 |

*Primary Examiner*—John D. Welsh
*Attorney*—Elton Fisher and Kenneth E. Prince

[57] ABSTRACT

Sulfonated oil emulsions are readily demulsified by contact with an alkyl amine and an acid. Such emulsions comprise cutting oils, and sulfonated petroleum fractions. The alkyl amines contain from one to five amine groups and from two to 12 carbon atoms.

14 Claims, No Drawings

DEMULSIFICATION OF SULFONATED OIL EMULSIONS

BACKGROUND OF THE INVENTION

This invention relates to a composition and the use of this composition in demulsifying sulfonated oil-water emulsions. Aqueous emulsions of these oils are difficult to break, and present serious waste disposal problems. The present invention presents an economical means for converting sulfonated oil emulsions into homogeneous oil and water layers which can be readily separated by well-known chemical process techniques.

Although specifically useful for demulsifying sulfonated oil emulsions, the invention is also useful for demulsifying other aqueous oil emulsions. The invention can further be used to prevent emulsification during chemical transport, and can be added to systems to prevent foaming. Additional uses of the present invention are only limited by the implementation of the technology as demulsification problems arise.

The prior art at present is best illustrated in U.S. Pat. No. 3,313,736. This patent sets out the use of polyalkeneimines of molecular weights from 800 to 1,000,000 or more as possible demulsifying and emulsifying agents. These polyalkeneimines are directly added to solutions to produce demulsification. In the present invention nonpolymeric alkyl amines in an acidic media are used to produce demulsification. Polyalkyleneimines are basic. It has been found that one need not use high polymeric amines if the oil to be demulsified is acidified. The alkyl amines of the present invention as used are less expensive and give good demulsification and phase separation when the emulsion is acidic. Other prior art processes include the addition of alum to an emulsion which causes the formation of an oil scum on the surface which is then separated. A disadvantage to this technique is that the oil is contaminated with alum and if it is to be reused, it must undergo expensive processing.

It is an object of this invention to set out compositions useful in demulsifying oil-water emulsions.

It is further an object of this invention to set out a method of demulsifying oil-water emulsions.

It is also an object of this invention to break sulfonated oil-water emulsions to produce homogeneous oil and water solutions.

SUMMARY OF THE INVENTION

Broadly, the present invention comprises the demulsification of sulfonated oil-water emulsions by treating the emulsion with a mineral acid and an alkyl amine. The emulsion then forms two discrete homogeneous layers. These layers can be readily separated by decantation, centrifugation or any other well-known method for removing one liquid layer from another.

In a more specific embodiment, the invention is directed to the demulsification of sulfonated cutting oil-water emulsions. These emulsions on contact with an alkyl amine and an acid readily form two discrete homogeneous layers. These layers or phases are easily separated.

DETAILED DESCRIPTION OF THE INVENTION

The emulsions that can be demulsified by the present invention comprise oil-water emulsions having an oil content which ranges from about 0.1 to about 50 percent by volume. Typical oils are the vegetable and petroleum oils. These may be themselves sulfonated as set out in Swiss Pat. No. 224,653, or they may be emulsified by an organic sulfonate agent as disclosed in U.S. Pat. No. 2,913,411. In either instance the acid alkyl amine of the present invention will effectively deactivate the sulfonate group and break the emulsion.

The term alkyl amine as used to describe this invention means an alkyl amine containing one to five nitrogen atoms and from two to 12 carbon atoms. These amines are of a relatively low molecular weight and comprise alkyl mono amines such as n-hexylamine to dodecylamine and alkyl polyamines having a general formula: $H_2N-(CH_2-CH_2-NH)_n-H$ where $n$ is an integer of from 1 to 4. The preferred species of these amines are ethylenediamine, diethylenetriamine, triethylenetetramine, and tetraethylenepentamine. The critical criteria in choosing a suitable amine is that the amine must be capable of forming a more covalent bond with the sulfonate groups in the oil. The polyamine must be capable of preferentially displacing the water molecule from the sulfonate. The alkyl polyamines of this invention effectively dehydrate the sulfonate group in acidic media.

The amount of alkyl amine added is generally dependent on the sulfonate content of the oil and amine group content of the alkyl amine. It is preferred that there be present about 0.8 to about 2 milliequivalent of amine nitrogen for each milliequivalent of sulfonate sulfur. Below about 0.8, demulsification becomes partial, while at about 2, besides an increase in the rate of demulsification, there appear to be no other advantages. Table 1 further illustrates the amount of alkyl amine which must be added to demulsify an oil with a 0.33 percent sulfur content.

TABLE I 0.33% Sulfonated Oil with Triethylenetetramine (TETA)

| Emulsion % Oil | TETA parts million | Milliequivalent s/l | Milliequivalent N/l |
|---|---|---|---|
| 1% | 32 | 0.96 | 0.90 |
| 2% | 61 | 1.92 | 1.80 |
| 5% | 157 | 4.80 | 4.30 |

The acids for acidifying the emulsion prior to alkyl amine addition include the halogen acids and sulfuric acid. Of these acids hydrochloric acid is preferred, with sulfuric acid also very effective. The acid is added to adjust the pH of the emulsion from about 3.5 to about 5.0. Adjusting the pH below about 3.5 yields the same degree of demulsification as a pH of 3.5. Above about 5 the degree of demulsification decreases, with poor demulsification above a pH of about 5.5. The preferred pH range is from about 3.8 to about 4.5.

The method of conducting the demulsification is variable. The emulsion can be first acidified and then the alkyl amine added, or the alkyl amine added and then acidified. And further the alkyl amine may contain part of the acid and the emulsion, the remainder, and these two solutions mixed. All of these modes of operation give good results. After addition of the acid and alkyl amine, the emulsion may be agitated by stirring or shaking. Agitation is not necessary, but it will substantially increase the rate of demulsification by increasing the rate of molecule contact. This emulsion containing demulsifier is allowed to sit and two distinct phases separate out. The original white cloudy emulsion forms a brown upper oil phase and a clear lower water phase. These phases are readily separated by tapping off either phase, decantation, centrifugation or a combination of these techniques.

Table II sets out a comparison of triethylenetetramine, a commercial quaternary amine demulsifier and a commercial high polymer amine demulsifier. These commercial demulsifiers are applied as 50 percent active aqueous solutions. For the commercial demulsifiers the amount in parenthesis gives the amount of 50 percent active material and the remaining number the amount on a direct correlation to TETA. Each emulsion is adjusted to a pH of 4.5 and a 1 percent aqueous solution of the demulsifier is titrated into the emulsion. Typical commercial cutting oil emulsions are used for this comparison, all containing 5 percent oil.

TABLE II

| TETA ml. | Polyamine ml. | Quat. amine ml. |
|---|---|---|

| | | | |
|---|---|---|---|
| SECO No. 190 Soluble Oil | 1.7 | (18.1)9.05 | (13.0)6.5 |
| Amocool Soluble Oil | 7.0 | (30.0)15.0 | (66.1)33.05 |
| Amocool Soluble Oil No. 2 | 5.7 | (27.7)13.85 | (59.4)29.7 |
| Amocool Soluble Oil HD | 5.2 | (29.8)14.9 | (92.0)46.0 |

The amounts of triethylenetetramine (TETA) necessary for breaking these emulsions is considerably lower than the amounts of commercially available demulsifiers. The rate of demulsification was also superior using TETA.

The following examples are set out to further amplify the invention.

EXAMPLE 1

0.8 ml. of 1 N HCl is added to a flask containing 20 ml. of a 5 percent cutting oil emulsion (SECO No. 190). The flask is agitated. To a second flask, 20 ml. of the 5 percent cutting oil emulsion and 3 ml. of an aqueous stock solution of triethylenetetramine (2 mg. of TETA per ml.) are added and the flask agitated. The contents of the flasks are combined and agitated for 30 seconds. Brown oil droplets separate immediately and rise to the surface. Upon standing overnight, the aqueous layer is clear.

EXAMPLE 2

0.8 ml. of 1 N HCl is added to a flask containing 20 ml. of a 5 percent cutting oil emulsion (SECO No. 190). The flask is agitated. To a second flask, 20 ml. of the 5 percent cutting oil emulsion and 2 ml. of an aqueous stock solution of triethylenetetramine (2 mg. of TETA per ml.) are added and the flask agitated. The contents of the flasks are combined and agitated for 30 seconds. Brown oil droplets separate immediately and rise to the surface. Upon standing overnight, the aqueous layer contains only a slight haze.

EXAMPLE 3

0.8 ml. of 1 N HCl is added to a flask containing 20 ml. of a 5 percent cutting oil emulsion (SECO No. 190). The flask is agitated. To a second flask, 20 ml. of the 5 percent cutting oil emulsion and 3 ml. of an aqueous stock solution of diethylenetriamine (DETA) (2 mg. of DETA per ml.) are added and the flask agitated. The contents of the flasks are combined and agitated for 30 seconds. Brown oil droplets separate immediately and rise to the surface. Upon standing overnight, the aqueous layer is clear.

EXAMPLE 4

0.8 ml. of 1 N HCl is added to a flask containing 20 ml. of a 5 percent cutting oil emulsion (SECO No. 190). The flask is agitated. To a second flask, 20 ml. of the 5 percent cutting oil emulsion and 3 ml. of an aqueous stock solution of ethylenediamine (EDA) (8 mg. of EDA per ml.) are added and the flask agitated. The contents of the flasks are combined and agitated for 30 seconds. Brown oil droplets separate immediately and rise to the surface. Upon standing overnight, the aqueous layer is clear.

EXAMPLE 5

0.8 ml. of N HCl is added to a flask containing 20 ml. of a 5 percent cutting oil emulsion (SECO No. 190). The flask is agitated. To a second flask, 20 ml. of the 5 percent cutting oil emulsion and 3 ml. of an aqueous stock solution of tetraethylenepentamine (2 mg. of tetraethylenepentamine per ml.) are added and the flask agitated. The contents of the flasks are combined and agitated for 30 seconds. Brown oil droplets separate immediately and rise to the surface. Upon standing overnight, the aqueous layer contains only a slight haze.

I claim:

1. The method of demulsifying sulfonated oil emulsions containing from about 0.1 to 50 percent by volume of said sulfonated oil, comprising:
   a. acidifying said sulfonated oil emulsion with a mineral acid,
   b. admixing said acidified emulsion with an alkyl amine to form an oil phase and a water phase, and,
   c. removing said oil phase from said water phase.

2. The method of claim 1 wherein said acidifying is with an acid selected from the group consisting of sulfuric acid and hydrochloric acid.

3. The method of claim 2 wherein said acid is hydrochloric acid.

4. The method of claim 1 wherein said alkyl amine is selected from the group consisting of ethylenediamine and diethylenetriamine and triethylenetetramine and tetraethylenepentamine.

5. The method of claim 1 wherein said oil phase is removed from said water phase by decantation.

6. The method of claim 1 wherein said alkylamine is added in an amount so that the mole equivalent of amine nitrogen is about 0.8 to about 2 times the mole equivalent of sulfonate sulfur.

7. The method of claim 1 wherein said emulsion is acidified to a pH of from about 3.5 to about 5.5.

8. The method of claim 8 wherein said pH is from about 3.8 to about 4.5.

9. The method of claim 1 comprising
   a. acidifying a sulfonated emulsion with 1 N hydrochloric acid to give pH of about 3.8 to about 4.5,
   b. admixing said acidified emulsion with an alkylamine selected from the group consisting of ethylenediamine and diethylenetriamine and triethylenetetramine to form an oil phase and a water phase, and
   c. removing said oil phase from said water phase.

10. The method of claim 9 wherein said alkylamine is added in an amount so that the mole equivalent of amine nitrogen is about 0.8 to about 2 times the mole equivalent of sulfonate sulfur.

11. The method of demulsifying sulfonated oil emulsions having a sulfonated oil concentration of from about 0.1 to 50 percent by volume comprising:
   a. admixing said sulfonated oil emulsion with an alkyl amine to form a mixture,
   b. acidifying said mixture with a mineral acid to form an oil phase and a water phase, and,
   c. removing said oil phase from said water phase.

12. The method of claim 11 wherein said acidifying is with an acid selected from the group consisting of sulfuric acid and hydrochloric acid.

13. The method of claim 11 wherein said acid is hydrochloric acid.

14. The method of claim 11 wherein said alkyl amine is selected from the group consisting of ethylenediamine and diethylenetriamine and triethylenetetramine and tetraethylenepentamime.

* * * * *